Figure 1:
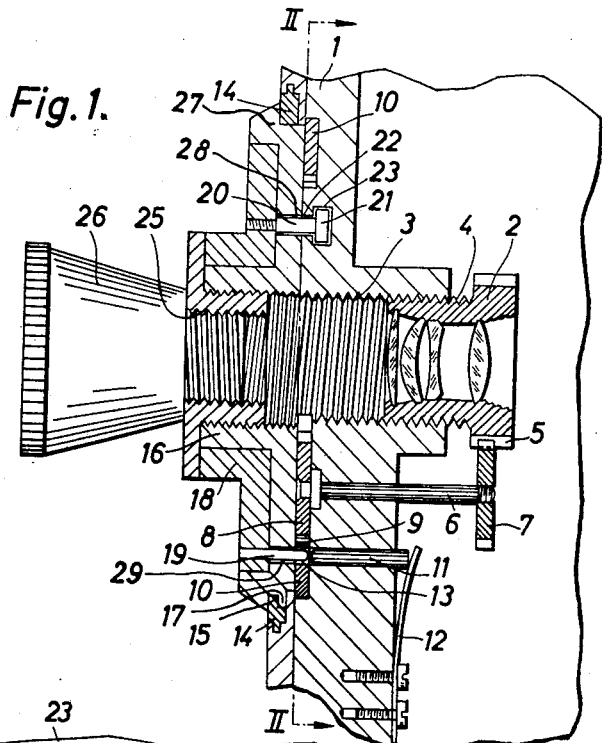

Dec. 25, 1962 K. NEUDECKER ETAL 3,069,988
CAMERA LENS TUBE ADAPTER
Filed March 10, 1961

INVENTORS
KARL NEUDECKER
KURT THATE
BY Connolly and Hutz
ATTORNEYS

United States Patent Office 3,069,988
Patented Dec. 25, 1962

3,069,988
CAMERA LENS TUBE ADAPTER
Karl Neudecker and Kurt Thate, Munich, Germany, assignors to Agfa Aktiengesellschaft, Leverkusen-Bayerwerke, Germany, a corporation of Germany
Filed Mar. 10, 1961, Ser. No. 94,924
Claims priority, application Germany Apr. 7, 1960
9 Claims. (Cl. 95—44)

This invention relates to an adapter for the lens tube of a still or motion picture camera which facilitates the engagement of interchangeable supplementary lenses, and it more particularly relates to such an adapter which facilitates the engagement of zoom supplementary lenses into close engagement with the normal built-in lens.

Supplementary lenses which are attached in front of the normal lens built into a camera generally incorporate their own focusing control, and the focus of the normal lens must be set to a predetermined condition before the supplementary lenses are attached to it. Devices have, therefore, been provided for adjusting the normal lens to this predetermined setting before the supplementary lens is attached in front of it. Other devices also are provided for preventing the attachment of a supplementary lens if the normal lens is not adjusted to the predetermined base setting suitable for use in conjunction with it.

When zoom supplementary lens attachments are used, these existing devices are not entirely satisfactory because zoom lens attachments must be arranged much more closely to the normal lens than the customary wide angle or telescopic supplementary lenses. This eliminates the space required to incorporate the aforementioned existing types of focusing devices. Furthermore, the normal lens arranged for use in conjunction with zoom lens attachments is seated so deeply within the front of the camera that removal of the zoom lens from in front of it gives the front of the camera a recause of its queer appearance in spite of its advantageous and odd in comparison to conventional types of cameras. A camera of this type would be difficult to sell because of its queer appearance in spite of its advantageous ability to receive zoom lens attachments. In addition, the exposed internal coupling elements for the supplementary lens are quite prone to damage and soiling when the supplementary lenses are detached.

An object of this invention is to provide a foolproof, convenient and attractive arrangement for mounting interchangeable supplementary objective lenses upon a camera which facilitates the attachment of a zoon type of supplementary lens.

Another object is to provide such an arrangement which insures that the normal lens is adjusted to a predetermined base setting suitable for attachment of supplementary lenses before these supplementary lenses can be attached; and A further object is to provide such an arrangement which utilizes an attractive adapter for protecting the means for focusing the normal lens and the means for coupling supplementary lenses to the camera when they are detached from it.

In accordance with this invention, an adapter is mounted in front of the normal lens when the supplementary lenses are detached. This adapter also shields a focusing element which is movably mounted upon the front wall of the camera to which it is locked to maintain the normal lens set to the predetermined base setting suitable for engagement of supplementary lenses. The adapter also includes a key which unlocks the focusing element from the front wall and permits movement of a portion of the adapter to focus the normal lens when the adapter is mounted upon the front wall. Interlocking means are also provided between the adapter and front wall to permit it to be dismounted from the front wall only when the normal lens is adjusted to its base setting. The adapter and focusing elements may both be concentrically mounted about the optical axis of the normal lens. The focusing element may be locked in its base setting by a locking pin which is resiliently urged to slide through the front wall, and the key which unlocks it may be a pin which projects from the adapter which disengages the locking pin from its hole in the focusing ring and engages the adapter with this same hole in the focusing ring. The focusing ring may advantageously include internal gear teeth and be rotatably mounted in a recess in the front wall. These internal gear teeth engage a geared transmission which adjusts the focus of the normal lens. In a particularly advantageous embodiment of this invention, the pin projecting from the adapter is mounted upon a rotatable control ring whose movement ultimately adjusts the focus of the normal lens.

In another aspect of this invention part of the interlocking means between the adapter and front wall is provided by an undercut arcuate slot in the front wall arranged concentrically about the optical axis. A pin having an enlarged head extends rearwardly from the adapter control ring at the same angular separation from its key projection as the locking pin within the front wall is separated from the entrance to the undercut slot through which the enlarged head of the interlocking pin can be engaged. The interlocking headed pin and slot, therefore, prevent the adapter from being either attached to or detached from the camera unless the normal objective lens is adjusted to its basic setting.

This invention, therefore, only permits the focus of the normal lens to be adjusted when the adapter is mounted in position. When the adapter is detached, the normal lens is automatically adjusted to the setting suitable for attachment of the supplementary lenses, and is adjustment cannot be changed while the adapter is off the camera. The focusing devices of the supplementary lens attachments are then utilized in focusing the composite lens without any possibility of interference with the desired focus by changes in the base setting of the normal lens.

This invention, therefore, makes it unnecessary to provide any means upon the supplementary lens attachments for insuring the correct adjustment of the normal lens to its base setting when they are attached to it. It is, therefore, possible to connect the supplementary lens attachments particularly zoom lens attachments directly to the normal lens without large air spaces being provided between them. Furthermore, it is no longer necessary to mount devices for focusing the normal lens upon the connecting portions of the supplementary lens attachment which considerably economizes and simplifies them. This invention in contrast permits the use of one adapter to insure that the normal lens is correctly focused before any supplementary lenses are attached to it.

Another advantage of the adapter of this invention is that it protects the mounting provisions for the supplementary lenses and the focusing element for the normal lens from damage and soiling when the supplementary lenses are detached from the camera. Still further, the appearance of the camera is extensively improved by the adapter of this invention by concealing the normal lens which is deeply seated within a recess. This adapter can also provide means for conveniently mounting filters such as sun and haze filters and the like in front of the normal lens which could not be readily mounted in front of a deeply seated normal lens.

Figure 2:
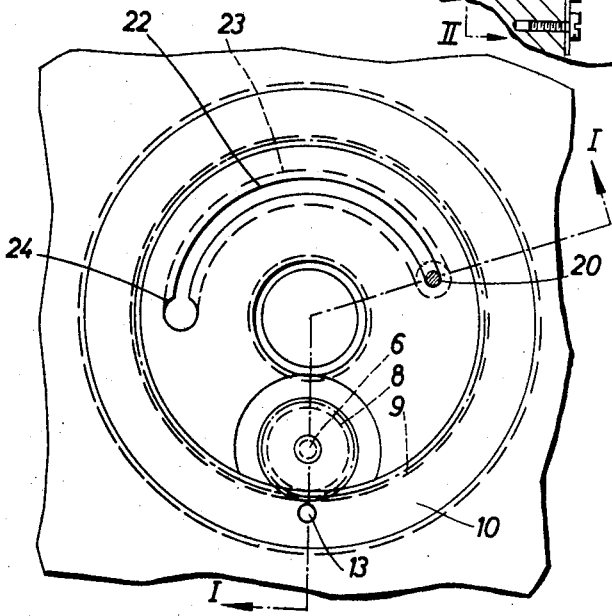

Novel features and advanatges of the present invention will become apparent to one skilled in the art from a reading of the following description in conjunction with the accompanying drawings wherein similar reference characters refer to similar parts and in which:

FIG. 1 is a cross-sectional view in elevation of one embodiment of this invention taken through FIG. 2 along the line I—I; and FIG. 2 is a cross-sectional view taken through the embodiment shown in FIG. 1 along the line II—II.

In the drawings is shown a photographic camera having a front wall 1 including a rear tubular socket in which normal lens tube 2 is adjustably mounted by engagement of its external threads 4 within internal threads 3 of the socket. A gear 5 is cut about the rear flange of lens tube 2, and it engages pinion gear 7 which is secured at the rear end of shaft 6. Another pinion gear 8 is secured to the front end of shaft 6 which is rotatably mounted within front wall 1. Rotation of shaft 6 and gears 7 and 8, therefore, changes the distance of lens tube 2 from the front of the camera thereby adjusting the focus of the normal lens 2. The lens tube and the normal lens within it are both designated for convenience by the same reference numeral 2.

Pinion gear 8 engages internal gear 9 cut upon the inner circumference of focusing ring 10 which is rotatably mounted within a recess in front wall 1 arranged concentrically about the optical axis of objective lens 2. An axially movable pin 11 is also mounted within front wall 1, and it is resiliently urged by leaf spring 12 into a hole 13 within ring 10. When spring 12 engages pin 11 within hole 13, this locks lens tube 2 in a predetermined base setting corresponding to one particular focusing distance because ring 10 and gears 5, 7 and 8 all are then locked against rotation. This predetermined base setting of lens 2 corresponds to the base setting which is suitable for engagement of supplementary lens attachments (not shown) which thereafter take over focusing of the composite lens that they form in conjunction with normal objective lens by adjustment of their own focusing arrangements.

A means for mounting attachments upon front wall 1 is provided by rotational coupling ring 14 including bayonet locking flanges 15. Only one of these bayonet locking flanges 15 is shown in the drawing, and the other conventional bayonet locking provisions and the means for rotating them within the limits required to lock attachments such as supplementary lens upon the camera are not shown.

Whenever a supplementary lens such as a zoom lens attachment incorporating bayonet flanges corresponding to those upon front wall 1 is locked upon front wall 1 by bayonet ring 14 and projections 15, the focusing adjustment for normal lens 2 must first be locked in the correct predetermined base setting by engagement of pin 11 within hole 13 and ring 10. Subsequent adjustment of focus is then only obtained by the focusing adjusting means provided upon the supplementary lens which is dependably utilized without any danger of undesired change in the base setting of lens 2.

When the supplementary lens (not shown) is detached from the camera, an adapter 16 including bayonet flanges 17 extending from its base 27 is locked upon front wall 1 by suitable rotation of bayonet ring 14. Adapter 16 includes a rotatable focus control ring 18 including a key 19 in the form of pin 19 which engages hole 13. A pin 20 including an enlarged head 21 also extends rearwardly from ring 18 of adapter 16. Key 19 and pin 20 extend respectively thorugh arcuate slots 28 and 29 in stationary base 27 of adapter 16. An undercut arcuate slot 22 is formed within front wall 1 including overhanging lips 23 which extend over the entire length of slot 22 with the exception of entrance hole 24 arranged in one end of this slot. Lips 23 retain head 21 within slot 22, and the only means of inserting or withdrawing head 21 from the slot is through entrance hole 24. Slot 22, entrance hole 24 and hole 13 in focusing element 10 are arranged to cause pin 20 to pass through entrance hole 24 into slot 22 and pin 19 to enter hole 13 when adapter 16 is mounted upon front wall 1. Pin 19 accordingly presses locking pin 11 out of hole 13 against the force of spring 12 which releases focusing ring 10 from front wall 1 and engages adapter 16 and its focus adjusting ring 18 with focusing ring 10. Adapter 16 is then locked upon front wall 1 by appropriate rotation of bayonet locking ring 14 which engages adapter base 27.

When adapter ring 18 is rotated, enlarged head 21 of pin 20 is rotated through slots 28 and 22 into engagement under lips 23 of slot 22. Pin 19 acting through slot 29, which is angularly similar to slot 22, carries focusing ring 10 along with it and through internal gear 9, pinion gear 8 rotates which transmits motion in turn through shaft 6 and engaged gears 7 and 5 to lens 2. The focus of normal lens 2 is, therefore, adjusted by axial variation in the engagement of threads 3 and 4. The focal setting of lens 2 can, therefore, only be adjusted by movement of adapter control ring 18 which incorporates the only provisions for unlocking focusing ring 10 from front wall 1. The nose of pin 11 contacted by pin 19 may be beveled to facilitate its disengagement from hole 13 by rotation of ring 10 even if it is not entirely pressed out of hole 13. Once adapter 16 is connected to the camera, the adjustment of normal lens 2 is easily accomplished by rotation of its control ring 18. Furthermore, adapter 16 can only be detached from front wall 1 in the angular position of its ring 18 in which enlarged head 21 of pin 20 can be removed through entrance hole 24 in slot 22. The angular displacement of pin 20 from pin 19 upon adapter ring 18 corresponds to the angular displacement between entrance hole 24 and hole 13 in front wall 1. This insures that pin 11 must engage hole 13 of focusing element 10 whenever adapter 16 is removed from front wall 1.

Adapter 16 also has the further advantage of shielding the connecting means for the coupling attachments provided by bayonet elements 14 and 15 and the focusing mechanism provided by engaged gear 8 and 9 which become exposed when supplementary lens attachments are removed from the camera. This protects these parts against soiling and damage, and it neatly conceals the indentations or recess which otherwise would be provided in front wall 1 by deeply seated normal lens 2. Adapter 16 also includes connecting means such as threads 25 for mounting a filter 26 such as a sun or haze filter in front of lens 2, which otherwise could not be conveniently attached to such a deeply seated objective lens.

It is also apparent that the transmission for connecting the motion of a focusing element to normal lens 2 can utilize other elements instead of gears 5, 7, 8 and 9 and shaft 6 which form a gear transmission. Normal lens 2 can also be positioned in a manner which allows gear 5 to directly engage internal gear 9. Furthermore, other motion transmission, which utilize suitable elements such as cams or worm gears, can be used instead of spur gears. In addition, other means for connecting attachments to front wall 1 can be used instead of bayonet flanges 14 and 15, but bayonet couplings are particularly advantageous because they permit the connection of supplementary lens attachments and adapter 16 without rotating them. A wide variety of supplementary lens attachments can, therefore, be connected in front of the normal lens such as telescopic, wide-angle or zoom lens objectives as well as anamorphic lens attachments because there is no necessity to rotate the supplementary lenses after they are attached.

What is claimed is:

1. An arrangement for mounting interchangeable supplementary objective lenses upon a camera incorporating a normal objective lens and having a front wall comprising adjustable coupling means connecting said normal lens to the inside of said front wall, a focusing element movably mounted upon said front wall, transmission means connecting said focusing element to said normal lens whereby movement of said focusing element adjusts the focus of said normal lens, a locking means on said front wall which engages said focusing element to lock it in a position in which said normal lens is adjusted to a predetermined setting suitable for engagement by one of said supplementary lenses, an adapter for mounting upon said front wall in front of said focusing element, coupling means upon said front wall for attaching said supplementary lenses and said adapter one at a time in front of said normal lens, key means upon said adapter which engages it with said focusing element and disengages said locking means for permitting said normal lens to be focused by movement of a portion of said adapter, interlocking means between said adapter and said front wall which permits said adapter to be dismounted from said front wall only when it is in a condition which adjusts said normal lens to said predetermined setting, said focusing element being circularly shaped, a recess being provided in said front wall, and said focusing element being rotatably mounted within said recess to provide a relatively smooth outer surface for said front wall.

2. An arrangement as set forth in claim 1 wherein said focusing element is formed as a ring which is concentrically mounted about the optical axis of said normal lens.

3. An arrangement as set forth in claim 1 wherein said transmission means comprises a gear train connecting said focusing element to said lens.

4. An arrangement as set forth in claim 1 wherein said focusing element comprises a ring including internal gear teeth concentrically mounted within said recess about the optical axis of said normal lens, said normal lens being threaded into a rearward extension of said front wall, and said transmission means comprising a rotatably mounted shaft including pinion gears at both ends, one of said pinion gears being engaged with said internal gear teeth, and the other of said pinion gears being engaged with gear teeth formed about the circumference of said normal lens.

5. An arrangement as set forth in claim 1 wherein said focusing element and said adapter are ring-shaped and mounted concentrically about the optical axis of said normal lens, said locking means comprising an aperture in said focusing element into which a resiliently actuated pin mounted in said front wall engages, and said key means comprises a projection extending rearwardly from said adapter which extends through said aperture in said focusing element to engage said adapter with said focusing element and disengages said locking pin from said focusing element whereby said focusing element is caused to rotate together with said portion of said adapter.

6. An arrangement as set forth in claim 5 wherein said interlocking means comprises an undercut arcuate slot in said front wall, a pin having an enlarged head extending rearwardly from said adapter, an entrance aperture extending through said arcuate slot which permits said enlarged head to enter said slot when said adapter is engaged with said focusing element in its condition which adjusts said normal lens to said predetermined setting, and said undercut slot holding said enlarged head locked within it for all positions other than the one in which said adapter adjusts said normal lens to said predetermined position.

7. An arrangement as set forth in claim 6 wherein the angular separation between said locking pin and said entrance aperture in said front wall corresponds to the angular separation between said enlarged headed pin and said key projection in said adapter.

8. An arrangement as set forth in claim 7 wherein said adapter comprises a base plate for stationary attachment to said front wall, a tubular socket including a front flange extending from said base plate, a control ring rotatably mounted between said front flange and said base plate, said enlarged headed pin and said key projection extending rearwardly from said control ring, and arcuate slots being formed in said base plate through which said enlarged headed pin and said key projection extend which permit said control ring to be rotated to vary the angular orientation of said enlarged headed pin and said key projection.

9. An arrangement as set forth in claim 1 wherein said adapter includes means for attaching auxiliary devices such as filters and the like in front of it.

References Cited in the file of this patent
UNITED STATES PATENTS
3,012,491    Malek _____ Dec. 12, 1961